April 19, 1966 E. S. HARRISON 3,246,902
APPARATUS FOR SEALING AND IMMOBILIZING A ROTATABLE SHAFT
Filed Sept. 14, 1962 3 Sheets-Sheet 1

INVENTOR.
EDWARD S. HARRISON
BY Thomson & Schowe
ATTORNEYS

April 19, 1966  E. S. HARRISON  3,246,902
APPARATUS FOR SEALING AND IMMOBILIZING A ROTATABLE SHAFT
Filed Sept. 14, 1962  3 Sheets-Sheet 2

INVENTOR.
EDWARD S. HARRISON
BY Thomson & Schoene
ATTORNEYS

April 19, 1966     E. S. HARRISON     3,246,902
APPARATUS FOR SEALING AND IMMOBILIZING A ROTATABLE SHAFT Filed Sept. 14, 1962     3 Sheets-Sheet 3

INVENTOR.
EDWARD S. HARRISON
BY *Thomson E Blose*

ATTORNEYS

United States Patent Office 3,246,902
Patented Apr. 19, 1966

3,246,902
APPARATUS FOR SEALING AND IMMOBILIZING
A ROTATABLE SHAFT
Edward S. Harrison, Pittsford, N.Y., assignor to Pfaudler Permutit, Inc., Rochester, N.Y., a corporation of New York
Filed Sept. 14, 1962, Ser. No. 223,667
6 Claims. (Cl. 277—8)

This invention relates to improved apparatus for sealing and immobilizing a rotatable shaft and more particularly a shaft extending through and sealed to an opening in a fluid containing vessel.

As discussed in United States Patent No. 2,911,240, there have long been many problems involved in replacing stuffing boxes and mechanical seals surrounding the agitator shaft for chemical processing vessels.

The above referred to patent presents a solution to the problem by immobilizing the agitator shaft and sealing the shaft to the vessel opening by auxiliary sealing means during replacement of stuffing boxes or mechanical seals. However, all known solutions to the problem have required axial movement of the agitation shaft from a normal rotating position to a second position in order to immobilize and seal the shaft. In order to overcome the inherent disadvantages of such known apparatus, I have invented novel apparatus for immobilizing and sealing the agitator shaft to the vessel opening without any axial movement of the agitator shaft. Therefore, it is a significant object of my invention to provide improved apparatus for immobilizing and auxiliary sealing of a rotatable shaft extending through a fluid containing vessel.

It is a prime object of my invention to provide improved auxiliary sealing and immobilizing means which eliminate axial movement of the agitator shaft prior to removing and replacing of the seal surrounding the drive shaft.

It is a further object of my invention to provide auxiliary shaft sealing and immobilizing means minimizing the time and effort necessary for the repair or removal and replacement of seals and stuffing boxes.

Other objects and advantages of this invention will be particularly set forth in the claims and will be apparent from the following description when taken in connection with the drawings in which:

Figures 1, 2:
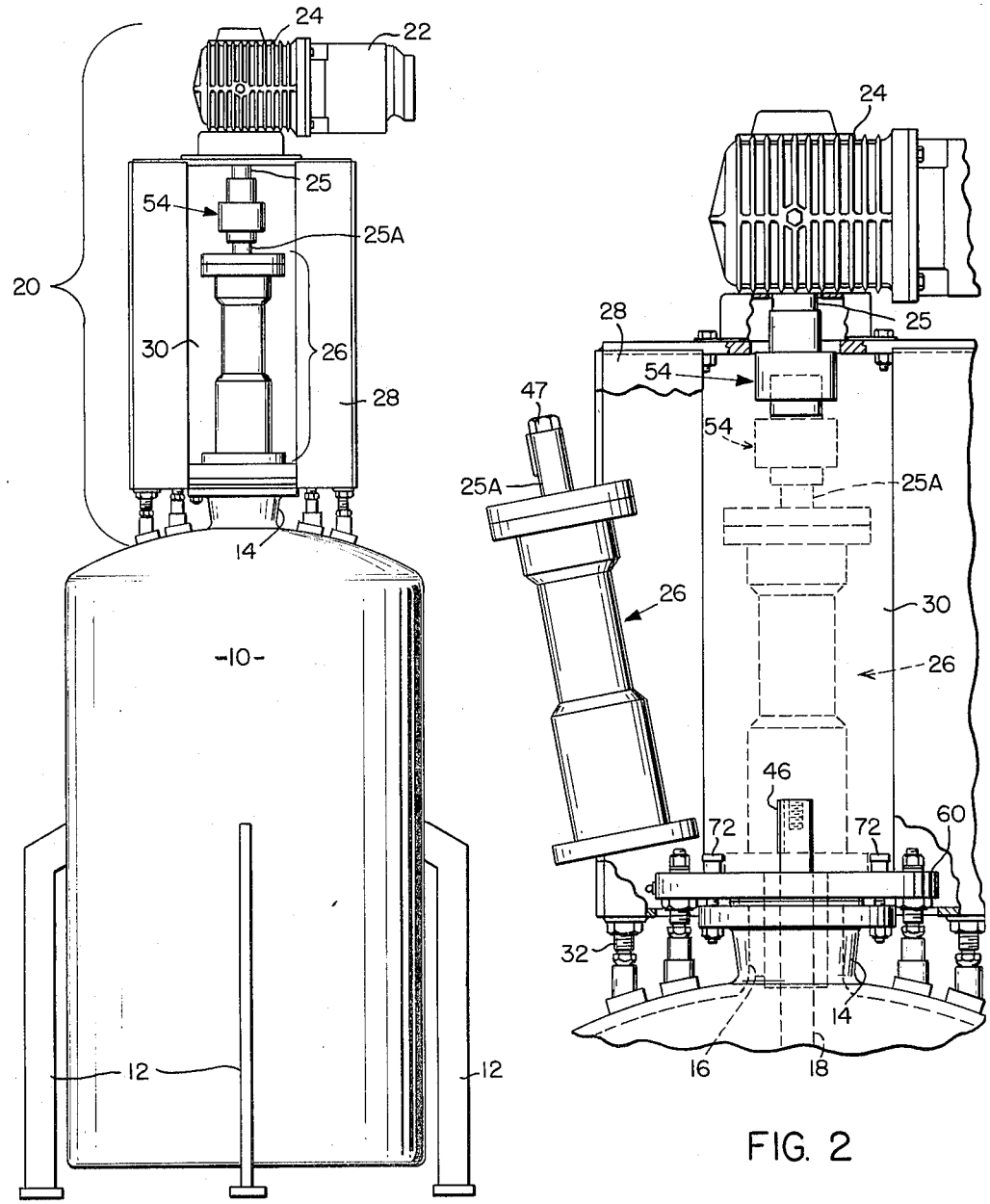
FIG. 1 is a side elevational view of a chemical reaction vessel embodying my invention.
FIG. 2 is an enlarged fragmentary side elevational view, partly in section, of the apparatus illustrated in FIG. 1 with the main sealing mechanism intermediate the driving mechanism and the agitator shaft, shown in operating position in broken line and in a removed position in solid line.

With reference to FIG. 1, I have illustrated a cylindrical tank or vessel portion 10 of a chemical reactor rigidly supported on vertically depending legs 12. The vessel 10 terminates in a cylindrical collar or flanged nozzle 14. Nozzle 14 is formed with a substantially cylindrical interior edge or wall 16 (FIGS. 2 and 3) forming an opening adapted to concentrically receive an agitator shaft 18 terminating in an impeller or other mixing elements (not shown) submerged in and adapted for mixing the fluid contained in the vessel 10.

An agitator driving mechanism generally indicated by the numeral 20 (FIG. 1) comprises a motor 22 rotatably driving a gear reducer 24, in turn driving an upper drive shaft section 25. The upper section 25 is rigidly keyed to an intermediate drive shaft section 25A which is rigidly keyed to the agitator shaft 18. The intermediate drive shaft section 25A extends through and is removable with a bearing and seal cartridge generally indicated by the numeral 26. A cylindrical housing or casing 28 adjustably mounted on the vessel 10 encloses the bearing and seal cartridge 26 and rigidly supports the gear reducer 24 and motor 22. Housing 28 is provided with at least one opening 30 adapted for removal and replacement of the bearing end seal cartridge 26 as illustrated in FIG. 2.

A bottom 31 of housing 28 has a plurality of threaded holes (not shown) adapted to receive a plurality of hollow threaded jacks 36 (FIG. 3) having an inner bore receiving bolts or studs 32. The lower ends of bolts 32 are threaded into bosses 34, rigidly carried on the vessel 10 in spaced relationship around the nozzle 14. The upper surface of the bosses 34 are concave or frictionally mating with a convex lower surface of jacks 36 when a nut 37, threaded onto the upper end of bolt 32 is threaded downwardly to frictionally engage the upper end of jack 36. The height and level of the housing 28 is adjustable by threading the housing up or down on the jacks 36 and subsequently adjusting a lock nut 38 to lock the housing into a selected position.

The gear reducer 24 and motor 22 are rigidly secured at the top of the housing 28 by bolts 40 extending through a plurality of holes and through the upper surface of the housing 28. In a radial flange 41 of a hollow gear reducer and motor support 42 agitator shaft 18 is rigidly connected to the intermediate drive shaft section 25A by a draw bar 44 threadedly received at 45 in the upper end of the agitator shaft 18. Draw bar 44 has a head 47 shouldered on the upper end of intermediate drive shaft section 25A for transmitting locking force between the agitator shaft 18 and the intermediate drive shaft section 25A. A key 46 is received in mating vertical keyways of the agitator shaft 18 and intermediate drive shaft section to prevent relative rotation between these shafts.

Upper and intermediate drive shaft sections 25 and 25A are locked against relative rotation. Upper and intermediate shaft sections 25 and 25A are each provided with vertical slotted key ways 48 and 49 adapted to receive keys 50 and 52 respectively keyed to a coupling generally indicated by the numeral 54 intermediate the two shaft sections 25 and 25A. Intermediate drive shaft section is axially supported by a double thrust bearing 56 supported inside of casing 58.

Upper drive shaft section 25 is detachably connected to the gear reducer 24 in a manner (not shown) permitting sliding movement of the shaft section 25 relative to the gear reducer 24. While I have not shown the details of such a connection, preferably I provide a quill or hollow shaft (not shown) extending vertically through the gear reducer and a key intermediate the quill or hollow shaft and the upper shaft section 25 to lock the quill or hollow shaft (not shown) and shaft 25 in driving relationship. Thus, rotational force is transmitted through the quill or hollow shaft (not shown) to the upper shaft section 25, to the coupling 54, to the intermediate shaft section 25A and to the agitator shaft 18.

The above described drive shaft sections 25 and 25A and agitator shaft 18 are axially aligned by the double thrust bearing 56 and a roller bearing 57 which are axially spaced and rigidly mounted within the bearing and seal cartridge 26.

I shall broadly described but not endeavor to delineate in detail the construction of the bearing end seal cartridge 26 because no specific construction of this part of the illustrated embodiment is of significance to my invention. It will be understood that any number of variations within the cartridge could be made within the scope of my invention. Broadly, the cartridge 26 includes a casing 58 rigidly mounted by a plurality of threaded bolts or screws 59 on a circular plate 60 forming part of a gland assembly, generally indicated by the numeral 62, and described in detail hereinafter. Two pairs of axially spaced mechanical seals 64 and 65, the details of which are not described in detail because they are old per se, are carried between the inside of casing 58 and the outside of intermediate drive shaft section 25A and agitator shaft 18, respectively. It will be understood that when the coupling 54 is moved axially upward thereby disconnecting the two drive shaft sections 25 and 25A, and the lower threads of the draw bar 44 are backed off from the top of the agitator shaft to disconnect shaft section 25A and agitator shaft 18, the intermediate drive shaft section 25A and bearing and seal cartridge 26 are removeable as a unit, in the manner illustrated in FIG. 2, for repair and replacement thereof.

Casing 58 is provided with a threaded inlet 67 and an outlet 68 which may be connected with a lubricant circulation system for keeping the entire seal end bearing cartridge and all parts therein filled with lubricant.

The plate 60 is adjustably supported on the vessel 14 by a plurality of jacks generally indicated by the numeral 70 of similar construction to that heretofore described with regard to the jacks 36 for adjustably mounting the housing 28 on the vessel 10. When the proper adjustment has been made with regard to the plate 60 on the jacks 70 depending upon the thickness of an annular sealing gasket 71 interposed between plate 60 and nozzle flange 74, a plurality of bolts 72, received in aligned bores of the plate 60 and a nozzle flange 74, are threaded at the lower end to receive nuts 75 to rigidly secure the plates 60 to the vessel 10.

Figure 4:
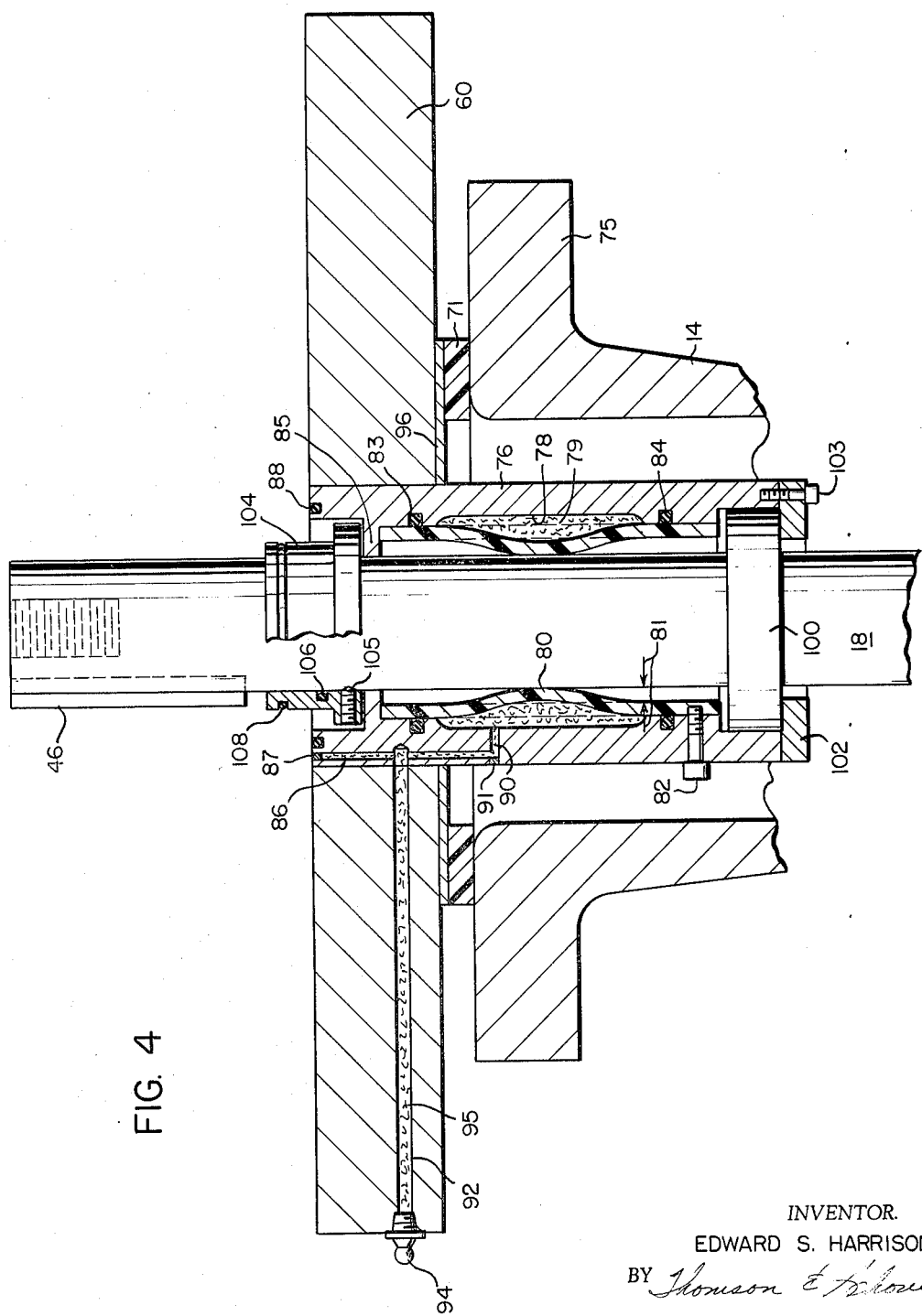
FIG. 4 is an enlarged fragmentary sectional view of the embodiment of my invention illustrated in FIG. 3.

With reference to FIG. 4, I shall now describe more in detail the illustrated embodiment of my novel apparatus for immobilizing and sealing the agitator shaft. I have provided a vertically disposed stainless steel plastic, carbon or other non-corrosive material cylindrical casing 76 rigidly mounted interiorly of a central bore of the annular plate 60. Casing 76 is provided with an internal concentric groove or recess 78 larger in diameter than the interior wall of the casing 76. Groove 78 and a deformable cylindrical seal 80, preferably of nylon or some resilient plastic, defines a cylindrical chamber 79. The upper end of deformable seal or sleeve 80 abuts a radial flange 85 of casing 76 and the lower end of seal 80 is rigidly secured to the inside wall of cylindrical casing 76 by a plurality of radially disposed screws 82 threadedly received in radial bores of the casing 76.

Seal 80 has an outside diameter providing a snug fit with the interior wall of cylindrical casing 76 to provide a substantially sealed relationship therebetween. However, I have provided a pair of annular O-ring seals 83 and 84 respectively seated in annular grooves of casing 76 above and below the chamber 79, thereby providing proper sealing of the deformable seal 80 on opposite sides of chamber 79. Deformable seal 80 is approximately one-fourth (¼) inch thick and of sufficient rigidity to prevent leakage of fluid under pressure between the seal 80 and the O-ring seals 83 and 84. A clearance of approximately .020 inch is provided between the inside diameter of seal 80 and the outside diameter of agitator shaft 18, illustrated by the two arrows 81. Seated in an annular horizontal groove in the upper edge of casing 76, I provide an O-ring 88 intermediate casing 76 and bearing and seal cartridge 26 for sealing internal pressure.

I shall now describe the channels through which fluids under pressure are conducted to chamber 79. Annular plate 60 has a horizontal radial bore 92 communicating with vertical bore 86 formed in casing 76. At the outside diameter of plate 60, I provide a fitting 94, such as, for example, a zerk fitting, threadedly received in the bore 92. Vertical bore 86 is sealed at its upper end by a weld 87. Vertical bore 86 communicates at its lower end with a radially disposed bore 90 being sealed at its outer extremity by a weld 91, and communicating with the annular chamber 79. Thus, I have provided a fluid tight conduit system from the fitting 94 through bore 92, annular slot 86, radial bore 90, to the chamber 79.

Plate 60 has an annular, smaller in diameter, stainless steel facing plate 96 rigidly mounted thereon surrounding the casing 76, thereby to provide a non-corrosive surface exposed to the interior of vessel 10.

Below the deformable seal 80, I provide a throttle seal 100 which constricts the flow of fluid into the area intermediate the agitator shaft 18 and the seal 80. While seal 100 is not essential to the concept of my invention, it does provide means for reducing the flow of fluid pressure above the seal 100. A stainless steel annular retainer plate 102 is rigidly mounted by screws 103 to the lower edge of casing 76 to retain the throttle seal 100 in position.

Although not essential to the concept of my invention, I have elected to illustrate a flanged sleeve 104 rigidly mounted to the agitator shaft by a plurality of set screws 105. The flanged sleeve 104 has an annular groove on the interior circumference thereof in which is seated an O-ring seal. O-ring seal 106 seals the collar 104 to the agitator shaft 18. An O-ring seal 108 is seated in an annular groove in the exterior circumference of sleeve 104. As will be understood with reference to FIG. 3, the exterior O-ring 108 seals the collar 104 with respect to the interior diameter of the lower end of intermediate drive shaft section 25A. This construction seals the outside of the agitator shaft 18 to the inside of the intermediate drive shaft section 25A.

In the operation, when there is a need for replacement or repair of the bearings and/or seals within the bearing or seal cartridge 26, a grease gun or other source of hydraulic fluid 95 under pressure is attached to the fitting 94 and fluid 95 under pressure is injected through horizontal bore 92, vertical bore 86, horizontal bore 90, to the annular chamber 79 until sufficient pressure is exerted on the external surface of the deformable seal or sleeve 80 to bring the internal surface of seal 80 into pressure gripping and locking relationship with the exterior surface of agitator shaft 18, thereby immobilizing the shaft and sealing the perimeter of the agitator shaft 18 from the escape of fluid under pressure from internally of the chamber. Next, coupling 54 is moved vertically to disconnect the two drive shaft sections 25 and 25A. The upper drive shaft section 25 is then moved vertically from the broken line position to the solid line position illustrated in FIG. 2 to provide sufficient clearance for removal of cartridge 26. The threads 45 of the draw bar 44 are unthreaded from the agitator shaft 18; screws 59 are then unthreaded to clear the threads in the plate 60.

Now, the bearing and seal cartridge 26 is free to be removed from the assembled position illustrated in broken lines in FIG. 2, through opening 30, to the solid line position illustrated in FIG. 2. This leaves the agitator shaft 18 with the upper end exposed as illustrated in FIG. 4. A new or repaired bearing and seal cartridge 26 may now be inserted over the agitator shaft 18 and the reverse sequence of steps above described are implemented to reassemble the agitator apparatus for operation.

The above described apparatus presents a tremendous advantage in time saved by immobilizing and sealing the agitator shaft 18 to the interior of the nozzle of vessel 10 through pressure means externally of the construction.

The flanged collar 104 being rigidly mounted on the agitator shaft 18 serves as an auxiliary means preventing axial movement of agitator shaft 18 when uncoupled from the drive shaft in the event of fluid pressure failure permitting collapse of the deformable seal or sleeve 80.

Figure 3:
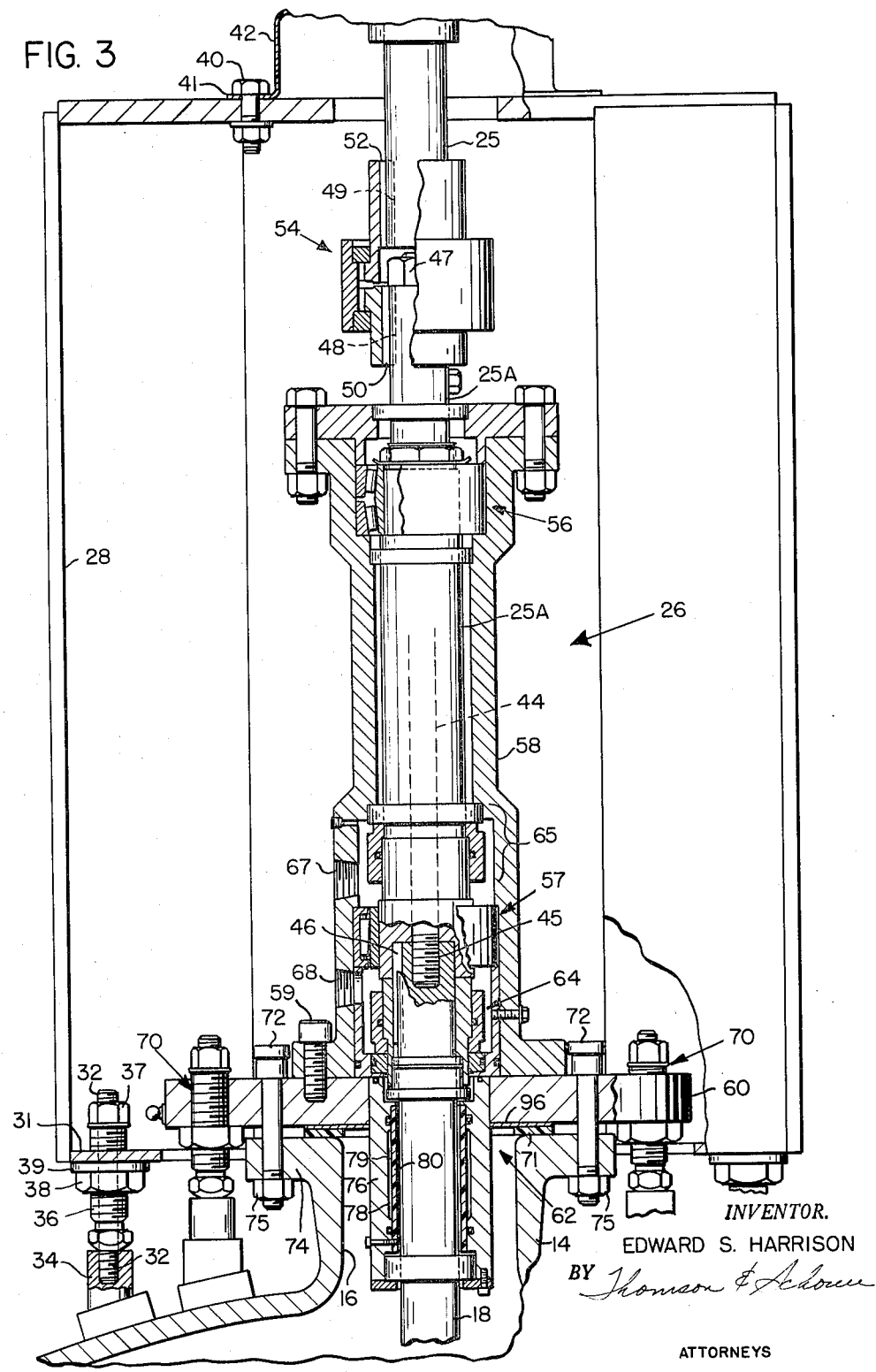
FIG. 3 is an enlarged fragmentary side elevational view, with parts broken away and partly in section, of the apparatus illustrated in FIG. 2 showing the details of my invention.

After the new or repaired bearing or seal cartridge 26 has been replaced and the apparatus is in the operative position illustrated in FIG. 3, the fluid pressure created in the chamber 79 behind the deformable seal is released by unthreading the fitting or by other outlet means similar to the horizontal radial bore 92 which would also communicate with the chamber 79 and be provided with a plug at the other end in order to maintain a pressure tight system for deforming seal 80.

While I have shown and described the preferred form of mechanism of my invention, it will be apparent that various modifications and changes may be made therein, particularly in the form and relation of parts, without departing from the spirit of my invention as set forth in the appended claims.

I claim:
1. Improved sealed shaft construction for use with a fluid containing vessel having an opening therein, comprising, in combination:
   (a) a first shaft having a first unsupported end extending substantially vertically through said opening into the vessel,
   (b) a second substantially vertically disposed rotatable shaft detachably fastened to a second end of said first shaft,
   (c) first main normally operative sealing means surrounding one of said shafts for sealing said vessel between the edges of said opening and one of said shafts, and
   (d) deformable auxiliary normally operative sealing means actuatable by fluid pressure from outside said vessel and located in the opening of said vessel inboard of said first sealing means for immobilizing and sealing said first shaft against axial movement while in its rotatable position.

2. A construction as claimed in claim 1 including:
   (e) means for detaching and removing said second shaft and first sealing means from said first shaft while maintaining said first shaft in said normal position.

3. A construction as claimed in claim 2 including:
   (f) an axially retractable third shaft detachably fastened in driving relationship with an upper end of said second shaft.

4. A construction in accordance with claim 3 including:
   (g) slidable coupling means intermediate said second and third shafts.

5. Improved sealed shaft construction for use with a fluid containing vessel having an opening therein, comprising in combination:
   (a) a first shaft having a first unsupported end extending substantially vertically through said opening into the vessel,
   (b) a second substantially vertically disposed rotatable shaft detachably fastened to a second end of said first shaft,
   (c) first main normally operative sealing means surrounding one of said shafts for sealing said vessel between the edges of said opening and one of said shafts, and
   (d) auxiliary normally inoperative sealing means actuatable from outside said vessel and located in the opening of said vessel inboard of said sealing means for immobilizing and sealing said first shaft against axial movement while in its rotatable position.

6. Improved sealed shaft construction for use with a fluid containing vessel having an opening therein, comprising in combination:
   (a) a first shaft having a first unsupported end extending substantially vertically through said opening into the vessel,
   (b) a second substantially vertically disposed rotatable shaft detachably fastened to a second end of said first shaft,
   (c) first main normally operative sealing means surrounding one of said shafts for sealing said vessel between the edges of said opening and one of said shafts, and
   (d) normally inoperative means adapted to engage the first shaft and being actuated from outside of said vessel for immobilizing and sealing said first shaft in its rotatable position against vertical axial movement, including an auxiliary normally inoperative seal in the opening of said vessel between the edges of said opening and said first shaft.

References Cited by the Examiner

UNITED STATES PATENTS

| 2,808,229 | 10/1957 | Bauer et al. | 277—182 X |
| 2,911,240 | 11/1959 | Boutros et al. | 277—9 |
| 2,924,467 | 2/1960 | Burch | 277—1 |
| 2,943,874 | 7/1960 | Valdi et al. | 277—34 |
| 2,945,665 | 7/1960 | Regan et al. | 277—34 |
| 2,969,248 | 1/1961 | Sulkowski | 277—1 |
| 3,023,995 | 3/1962 | Hopkins | 277—34 X |
| 3,063,725 | 11/1962 | Frey | 277—4 |

FOREIGN PATENTS 616,799  1/1949  Great Britain.

LAVERNE D. GEIGER, *Primary Examiner.*

SAMUEL B. ROTHBERG, *Examiner.*

E. DOWNS, *Assistant Examiner.*